Jan. 23, 1968        L. W. BRECK, JR        3,365,016

MOTOR VEHICLE SPEED REGULATING DEVICE

Filed Oct. 24, 1965                                2 Sheets-Sheet 1

Louis W. Breck, Jr.
INVENTOR.

BY

ATTORNEY

United States Patent Office 3,365,016
Patented Jan. 23, 1968

3,365,016
MOTOR VEHICLE SPEED REGULATING DEVICE
Louis W. Breck, Jr., El Paso, Tex., assignor to Del Norte Products, Inc., El Paso, Tex., a corporation of Texas
Filed Oct. 24, 1965, Ser. No. 504,799
4 Claims. (Cl. 180—108)

ABSTRACT OF THE DISCLOSURE

A motor vehicle speed regulating device employing a speed-sensing device operating from the speedometer drive, and a speed governor cooperating with the speed-sensing device and responsive to differential fluid pressures between the manifold vacuum and external air pressures to regulate the vehicle speed.

---

Figure 1:
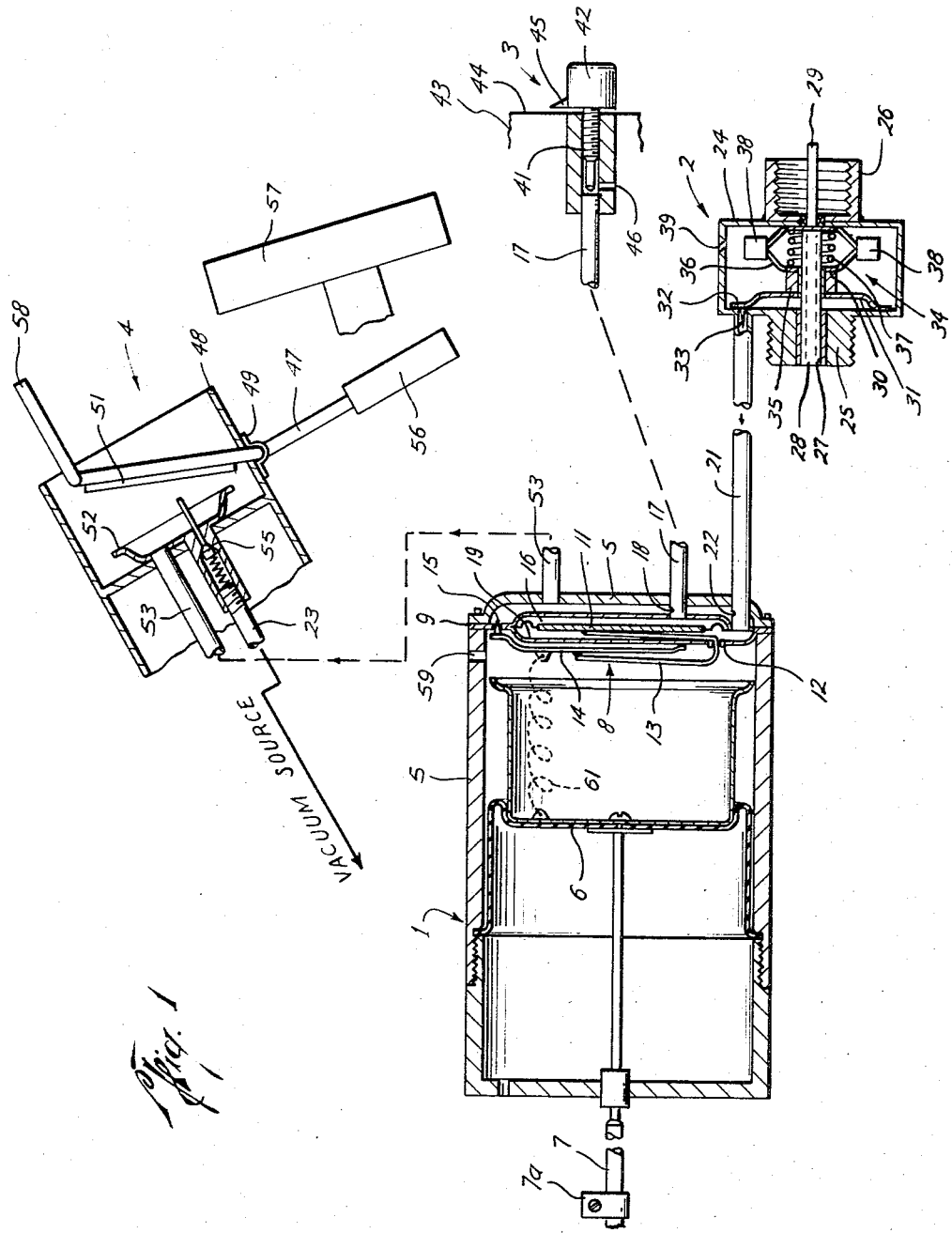

This invention relates to speed regulating devices and more particularly, but not by way of limitation, to motor vehicle speed regulating devices.

Various speed regulating devices are known to the art. Some employ a unit for sensing the speed of the vehicle and in response to that speed the unit directly regulates an actuator which manipulates the motor vehicle throttle. The speed sensing unit usually employs a centrifugal device which cooperates with mechanical means to permit adjustment of the speed. Other devices employ a pressure transducer as a speed sensor, and the speed sensor operates a pilot valve which in turn controls an actuator connected to the motor vehicle throttle. In these latter devices the speed of the motor vehicle may be set by a spring or the like incorporated in the pilot valve or by using mechanical means in the speed sensor to modulate its pressure output.

In many of the prior art devices the speed sensing unit is of necessity a rather complex and bulky item since it either controls the throttle actuator directly and/or incorporates mechanical means to permit adjustment of the speed of the motor vehicle. In others, the pressure source controlling the various mechanisms must be regulated which requires the addition of equipment for that purpose.

Accordingly, it is an object of the present invention to provide a device which overcomes many of the disadvantages of prior art speed regulating devices.

It is also an object of the present invention to provide improved means enabling the driver of a motor vehicle to maintain a desired speed automatically without manual operation of the throttle.

Another object is to provide improved means for setting the speed of the vehicle over a wide range of speeds.

Another object is to provide means for maintaining the set speed when going over hills or when encountering other conditions which would tend to change the speed of the automobile.

Yet another object is to provide a device which can be easily installed on existing vehicles and on new vehicles as they are manufactured.

Still another object is to provide a device which automatically disengages when the brakes of the vehicle are applied.

A further object is to provide an overriding feature if it is desired to exceed the set speed temporarily.

Another object is to provide a device which is simple and low in cost.

The invention may be described generally as a regulating device for controlling the speed of motor vehicle having speed adjusting means, which device comprises a first moveable wall; an enclosure for containing the first moveable wall so that a differential pressure may exist thereacross; means for communicating each side of the enclosure with a first source of fluid pressure; means for adjustably venting one side of the enclosure to a second source of fluid pressure, the pressure in the first and second sources being different; means, including a governor, for venting the other side of the enclosure to said second source of fluid pressure in an amount proportional to the speed of the vehicle; a moveable wall connected to the motor vehicle speed adjusting means whereby movement of the second moveable wall will actuate the adjusting means; a housing which sealingly engages the second moveable wall thereby dividing the housing; means for communicating one side of the housing with the first source of fluid pressure and means operably associated with the first moveable wall and the means for communicating said one side of the housing with the first source of fluid pressure for controlling the amount of pressure applied to said one side of the housing in response to movement of the first moveable wall.

To be more specific, reference is here made to the drawings:

In the drawings:

FIG. 1 is a partially cutaway cross-sectional view of one embodiment of the invention which illustrates in dotted line a spring which can be used with yet another embodiment of the invention.

Figure 2:
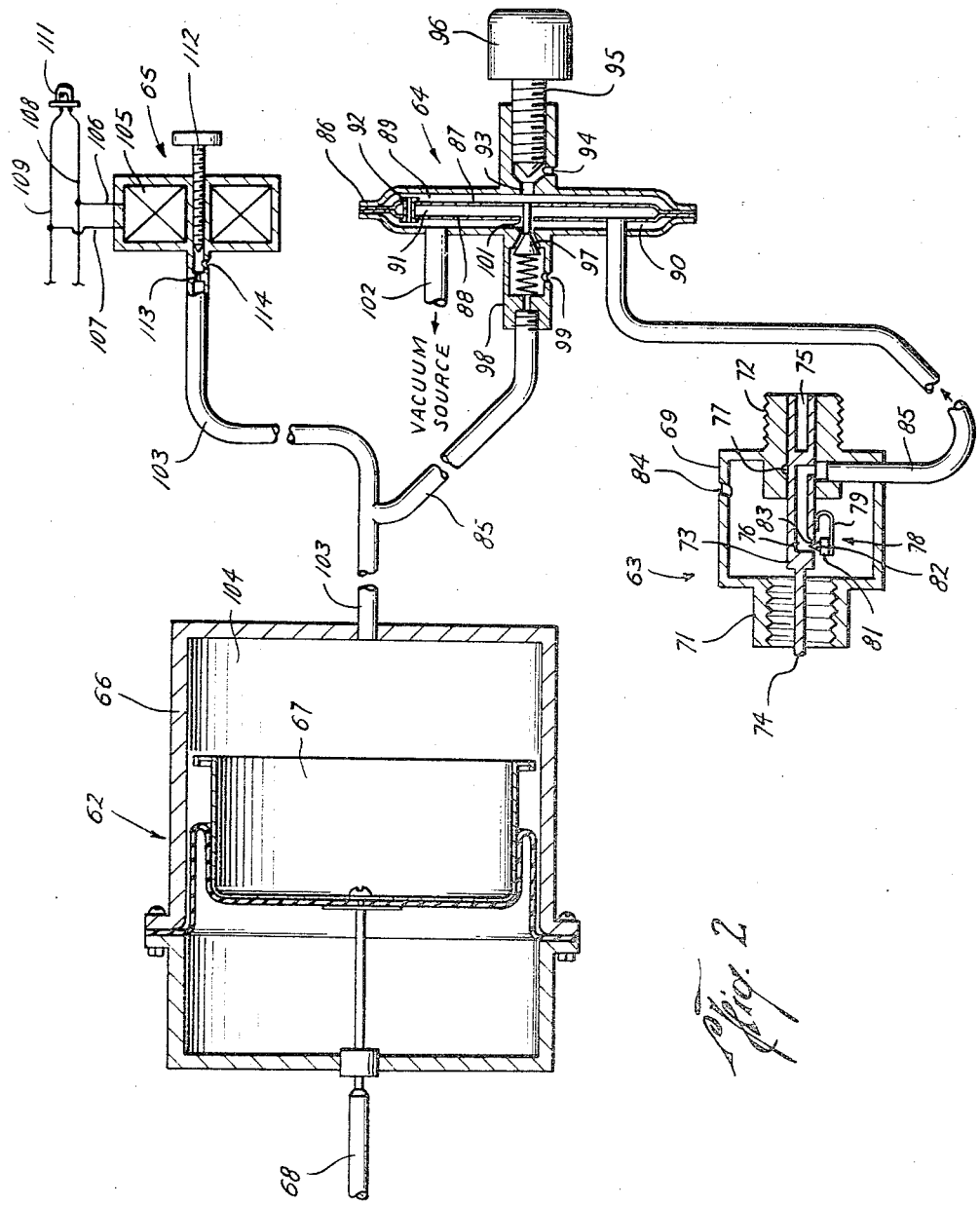

FIG. 2, similarly, is a partial cutaway cross-sectional view of yet another embodiment of the invention.

The speed regulating devices of the present invention are particularly applicable for use on a conventional motor vehicle powered by an internal combustion engine and the discussion of the illustrated embodiments will, for convenience, be described in such an environment, although the invention has many other uses.

Referring now in particular to FIG. 1, the embodiment illustrated comprises four basic assemblies, namely, a throttle actuator 1, a speed sensor 2, a speed setting unit 3, and a disengaging unit 4, all of which are interconnected by vacuum conduits, the detail of which will be explained.

The throttle actuator includes a housing 5 which sealingly retains the periphery of a diaphragm and piston assembly 6. Connected to assembly 6 by any suitable means is a flexible cable 7 provided with a clip 7a which is adapted to be connected to the throttle linkage of the motor vehicle near the carburetor. Housing 5 may be bolted to the motor vehicle engine by any suitable means, and is so positioned relative to the throttle that when tension is applied to cable 7 by diaphragm assembly 6, the throttle will open causing the speed of the vehicle to increase.

Also part of the throttle actuator is the control unit 8, the function of which is to control the amount of vacuum applied to diaphragm assembly 6. Control unit 8 consists of an enclosure 9 which sealingly retains the outer periphery of a diaphragm assembly 11. Enclosure 9 is provided with a flexible grommet 12 through which passes U-shaped link 13 one end of which is affixed to diaphragm assembly 11 and the other end of which is affixed to spring 14 which at its tip carries conical valve plug 15.

Communicating with side 16 of enclosure 9 is a conduit 17 which is provided with a flow restricting orifice 18 which opens into housing 5. Communicating with the other side 19 of enclosure 9 is a conduit 21 which is provided with a flow restricting orifice 22 which also opens into housing 5. A third conduit 23 opens into housing 5 as illustrated in FIG. 1.

Conduit 21 communicates with speed sensor 2 to which reference is here made. Speed sensor 2 consists of a cover 24 provided with a male threaded nipple 25 and a female threaded coupling 26. Cover 24 rotatably carries a shaft 27 provided with a square socket 28 and a square end 29. Shaft 27 passes through a flat spring 31 provided with a tapered valve plug 32 which registers with, and as illustrated in FIG. 1, is adapted to enter the opening 33 in conduit 21. Fixed to shaft 27 for rotation therewith is a governor 34 which includes a sleeve 35 and plates 30 which are affixed to flexible arms 36. Retained between plates 30 is a helical spring 37 and carried at the end of arms 36 are weights 38. Speed sensor 2 serves to variably vent side 19 of enclosure 9 to the atmosphere. It offers high resistance to air flow through aperture 39 in cover 24 and opening 33 when valve plug 32 is engaged with opening 33. Progressively less resistance to air flow is realized as valve plug 32 moves out of engagement with opening 33. Because plug 32 is tapered the change in flow resistance will be substantially linear as plug 32 moves relative to opening 33.

Speed sensor 2 is installed on the transmission of a motor vehicle by disconnecting the speedometer cable of the automobile from the transmission and screwing coupling 26 to the fitting on the transmission. The speedometer cable is then attached to nipple 25 and the transmission will drive the speedometer cable through shaft 27 of speed sensor 2. When the motor vehicle is stopped, spring 37 forces plug 32 into engagement with opening 33 which effects the greatest restriction of air flow as explained before. As the motor vehicle speed increases, weights 37 acting through flexible arms 36 and plates 30 compress spring 37 to move plug 32 out of engagement with opening 33, thus decreasing the resistance to flow as explained before.

Reference is now made to the speed setting unit 3 which serves as a variable resistance to flow which can be set manually. Speed setting unit 3 consists of a needle valve 41 provided with a knob 42, both of which are supported by a container 43 which may be suitably affixed to the dashboard of the motor vehicle. The face 44 of container 43 may be calibrated in miles per hour so that the operator of the vehicle may align pointer 45 on knob 42 with the speed at which he wishes to maintain the vehicle. Rotation of knob 42 will variably vent conduit 17 to the atmosphere through aperture 46 in a conventional manner. Venting of conduit 17 also effects venting of side 16 of enclosure 9.

Reference is here made to the last of the four assemblies, the disengaging unit 4. Disengaging unit 4 serves to disengage the speed regulating device when the motor vehicle brakes are applied by cutting off the source of vacuum to the assemblies and opening the speed regulating device to the atmosphere. Disengaging unit 4, which is suitably attached to the vehicle steering column, includes an arm 47 pivotally attached to bracket 48 by clamp 49. Attached to arm 47 is a resilient seal 51 which is adapted to cover concave plate 52 also attached to bracket 48. Communicating with the bottom of plate 52 are conduits 53 and 23, the latter of which is provided with a spring loaded poppet valve 55.

Arm 47 is provided with a weight 56 at one end so that when brake pedal 57 contacts arm 47 upon being depressed, the resilient seal will be maintained out of engagement with the plate 52.

Conduit 23 is connected to a convenient vacuum source such as the intake manifold of the motor vehicle and can only communicate vacuum through conduit 53 when seal 51 is engaged with plate 52 by depressing extension 58 of arm 47. Seal 51 upon being engaged with plate 52 depresses poppet valve 55 opening conduit 23. The vacuum in conduit 23 will maintain the engagement between seal 51 and plate 52 until the brake pedal is depressed causing seal 51 to pivot into the disengaged position.

When a vacuum is established in conduit 53 and housing 5, air can flow along three paths in the device. One path is through the flow restricting orifice or aperture 59 past plug valve 15 and into conduit 53. Aperture 59 and plug valve 15 act as restrictions to the flow of air causing a certain negative pneumatic pressure, i.e., a vacuum, to exist behind diaphragm assembly 6. Moving plug valve 15 to the left as viewed in FIG. 1 decreases its resistance to the flow of air, thus increasing the vacuum behind diaphragm assembly 6.

A second path of air is through the speed setting unit 3 by way of aperture 46, conduit 17, flow restricting orifice 18, and conduit 53. The vacuum applied to side 16 of enclosure 9 is increased or decreased by increasing or decreasing, respectively, the flow resistance of the speed setting unit 3.

The third path of air flow is through the speed sensor 2 by way of aperture 39, valve plug 32, conduit 21, flow restricting orifice 22 and conduit 53. Vacuum on side 19 of enclosure 9 is increased or decreased by increasing or decreasing, respectively, the flow resistance of speed sensor 2.

To understand the operation of the illustrated embodiment assume that the motor vehicle is running steadily at the speed set on the speed setting unit 3. Under this condition valve plug 15 is open just enough to cause the proper vacuum behind diaphragm assembly 6 for maintaining the proper throttle opening for the set speed. This means that the pressure differential across diaphragm assembly 6 is just enough to balance plug 15 against spring 14 at the necessary opening.

Suppose now that the vehicle encounters an incline so that it slows slightly from the set speed. When this happens rotation of shaft 27 slows and plug 32 moves inwardly due to the decreased centrifugal force exerted by weights 38. This increases the flow resistance of the speed sensor 2 which in turn increases the vacuum on side 19 of enclosure 9. The pressure differential thus developed across diaphragm assembly 11 causes a greater force to the left on plug valve 15, opening plug valve 15 more. This movement of plug valve 15 increases the vacuum on diaphragm assembly 6 and causes the automobile to accelerate until it regains the set speed.

Conversely, a slight increase in the speed of the vehicle causes a decrease in the resistance of speed sensor 2, a decrease in vacuum on side 19 of enclosure 9, a movement of plug valve 15 to the right and a decrease of vacuum on diaphragm assembly 6. The reduction in vacuum applied to diaphragm assembly 6 will of course result in a deceleration of the vehicle.

Thus it can be seen that the overall action of the speed regulating device is to maintain a uniform speed. Changes in set speed are made by turning knob 42 of the speed setting unit 3, thus changing the flow resistance of unit 3. If knob 42 is turned to increase the flow resistance, the vacuum on side 16 of enclosure 9 increases, plug valve 15 moves to the right and the motor vehicle slows until the resistance of the speed sensor 2 increases so that a new, slower stable speed is reached. Similarly, a decrease of resistance in the speed setting unit 3 causes an increase in set speed.

Since the throttle actuator 1 uses a flexible cable 7 to operate the throttle, the cable 7 can pull but not push. Thus the regulating device can be overridden, for passing other vehicles, simply by pushing on the conventional accelerator pedal.

To disengage the regulating device, the operator simply depresses brake pedal 57 which interrupts the vacuum to the throttle actuator 1 and in effect permits complete venting of housing 5 to the atmosphere through aperture 59.

One of the basic problems in the design of a speed regulating device is that of achieving stability (preventing cycling or hunting above and below the set speed). The present invention may employ either of two types of controller action to ensure speed stability; namely, proportional speed floating action and proportional position action.

In the proportional speed floating action version of the invention, illustrated in FIG. 1, the vehicle throttle moves in an opening or closing direction as long as a difference exists between the desired vehicle speed (as determined by the speed setting unit 3) and the actual vehicle speed (as determined by the speed sensor 2). To achieve proportional speed floating action, valve plug 15 is substantially tapered as shown in FIG. 1 and spring 14 has a substantial spring rate. Spring 14 normally maintains plug 15 in a partially open position so that the pressure behind diaphragm assembly 6 is approximately that required to balance cable 7 against the throttle without movement of the throttle. An error in speed causes diaphragm assembly 11 to move plug valve 15 in an opening or closing direction until the force exerted by diaphragm assembly 11 balances the counteracting force of spring 14. The rate at which the throttle opens or closes is approximately proportional to the speed error, this fulfilling the criterion for a proportional speed floating action regulator.

A regulating device with proportional position action opens or closes the throttle a cerain amount rapidly in response to an error. The amount the throttle is opened or closed is proportional to the magnitude of the error. Proportional position action is achieved by making plug 15 blunt and the spring constant of spring 14 very low. Spring 14 is biased so that diaphragm assembly 11 must exert a substantial force to open plug valve 15. When this minimum force is exceeded by a small amount, however, plug valve 15 opens completely due to its blunt shape and the low spring constant of spring 14. This of course causes rapid opening of the throttle.

As the throttle opens, the vehicle vacuum decreases which in turn causes the force exerted by diaphragm 11 to decrease since the force it exerts is proportional to the vacuum supply pressure in conduits 53 and 23. When the force exerted by diaphragm 11 decreases to a minimum force required to open plug valve 15, a new stable position of the actuator is reached and the throttle ceases to open further. Similarly, a speed error causing a decrease in force exerted by diaphragm 11 will close plug valve 15, causing the throttle to close until a new stable position is reached. Thus, a difference between desired and actual vehicle speed causes change in the force exerted by diaphragm assembly 11 which result in rapid changes in position of the throttle which are approximately proportional to the error, thus fulfilling the requirements of a proportional position action regulator.

In actual practice, the speed with which the actuator may move in the above proportional position system is limited because there is a delay between vacuum pressure change at the automobile throttle and the corresponding change of force exerted by diaphragm 11. This delay is caused primarily by flow restricting orifices 18 and 22. If the speed of response is too great, overshooting or undershooting of the stable throttle position occurs, resulting in instability. This limitation may be overcome by adding, as illustrated in dotted line in FIG. 1, a tension spring 61 connected at one end to diaphragm assembly 6 and at the other to spring 14 or plug valve 15. The tension in spring 61 is such that it opens plug valve 15 at mid-stroke of the diaphragm assembly 6. This position corresponds to the average throttle opening, and while plug valve 15 is illustrated as tapered, it is understood that the spring 61 is used when plug valve 15 is blunt. When spring 61 is utilized, the forces exerted by diaphragm assembly 11 result in new stable actuator positions in which spring 61 balances the error forces. The action of spring 61 is of course instantaneous. The fact that the average throttle opening corresponds to zero force exerted by diaphragm assembly 11 minimizes the effect of vacuum variations.

Referring now to the embodiment of the invention illustrated in FIG. 2, the regulating device comprises four assemblies, namely, a throttle actuator 62, speed sensor 63, control unit 64 and disengaging unit 65. All four units are intercommunicated by conduits which will be explained in detail.

The throttle actuator includes a housing 66 which sealingly engages the periphery of a diaphragm and diaphragm plate assembly 67 which through a flexible cable 68 is adapted to be connected to a throttle linkage in the same manner as the FIG. 1 embodiment. Enclosure 66 is suitably attached to the motor vehicle engine and so positioned that when tension is applied to cable 68 by diaphragm assembly 67 the throttle of the automobile will be opened.

Reference is now made to the speed sensor 63. Speed sensor 63 includes a cover 69 provided with a female threaded coupling 71 and a male threaded nipple 72. Rotatably mounted in cover 69 is a shaft 73 which is provided with a square end 74 and a square socket 75. Shaft 73 has a passageway 76 which opens at one end into an annular groove 77 in nipple 72. Shaft 73 also carries a governor 78 which includes a spring 79, a weight 81 and a plug valve 82 which registers with and is adapted to engage an opening 83 is passageway 75 as illustrated in FIG. 2. Cover 69 is provided with an aperture 84 which permits air to communicate through opening 83, passageway 76, annular groove 77 and conduit 85.

The function of the speed sensor 63 is to act as a variable restriction to the flow of air: It offers high resistance to air flow at low speeds and progressively less resistance as the speed of the motor vehicle increases. Specifically, the speed sensor 63 is installed behind the vehicle's speedometer housing by disengaging the existing speedometer cable, screwing coupling 71 to the fitting on the speedometer housing and engaging the speeodmeter cable with nipple 72, Thus, the speedometer cable drives the speed sensor which in turn drives the speedometer. Vacuum applied to conduit 85 induces a flow of air through aperture 84, past plug valve 82, through passageway 76 into annular groove 77 and then into conduit 85. When shaft 9 is rotating slowly or not at all, i.e., the vehicle is moving slowly or stopped, plug valve 82 is closed by spring 79 and allows little or no flow. As the vehicle speeds up shaft 73 will rotate faster causing plug 32 to move outwardly due to the centrifugal force of weight 81. This allows a greater flow around plug valve 82.

The control unit 64 is mounted on the dashboard of the vehicle in any suitable manner. The function of unit 64 is to increase or decrease the vacuum applied to the throttle actuator 62 if the speed of the vehicle falls below or above the set speed. Control unit 64 includes an enclosure 86 which sealingly retains the periphery of a diaphragm 87 and a rigid plate 88. Enclosure 86 is divided by diaphragm 87 into sides 89 and 91 which are communicated by a hollow sleeve 92 which passes through plate 88 and diaphragm 87. Side 89 of enclosure 86 is vented to the atmosphere through apertures 93 and 94, the flow through which is controlled by a needle valve 95. Manual adjustment of needle valve 95 is effected by rotation of knob 96 attached thereto.

Secured to diaphragm 88 is the tip of a spring biased poppet valve 97 carried by a nipple 98 which is provided with an aperture 99. Poppet valve 97 freely passes through an aperture 101 provided in plate 88.

Communicating with chamber 90 is a conduit 102 which is connected to a convenient vacuum source such as the intake manifold of the vehicle engine. Vacuum applied through conduit 102 causes air to flow through three paths in control unit 64. One path is through aperture 99, around poppet valve 97, through chamber 90 and through conduit 102. A second path is through aperture 94, past needle valve 95, through aperture 93, through flow restricting sleeve 92 and conduit 102. Sleeve 92 serves as a flow restricting orifice between side 89 and conduit 102. By increasing or decreasing the resistance to flow around needle valve 95 the vacuum in side 89 of enclosure 86 is increased or decreased, respectively. The third path of flow is through speed sensor 63 by way of aperture 84, past plug valve 82, through passageway 76, annular groove 77, conduit 85, aperture 101 and conduit 102. Aperture 101 here serves as a flow restricting orifice between side 91 and conduit 102.

The proper clearance is provided between aperture 101 and the stem of poppet valve 97 so that it offers the same resistance to flow as sleeve 92. Vacuum in side 91 of enclosure 86 is increased or decreased by increasing or decreasing, respectively, the resistance to flow around plug valve 82.

With regard to the first path of flow, i.e., around poppet valve 97, the aperture 99 and valve 97 act as restrictions to the flow of air causing a certain negative pressure, i.e., vacuum to exist in conduit 85. Moving valve 97 to the left as viewed in FIG. 2, decreases the resistance and thus increases the vacuum in conduit 85. Conversely, increasing the resistance will decrease the vacuum. Conduit 85 communicates with a conduit 103 which in turn communicates with side 104 of housing 66. The amount of vacuum in side 104 of housing 66 will through diaphragm assembly 67 affect the tension on cable 68.

The reset unit 65 which communicates with conduit 103 includes a wire coil 105 provided at its ends with conductors 106 and 107. Conductors 106 and 107 are connected, respectively, to conductors 108 and 109 which carry current to the motor vehicle brake light 111.

Reciprocally mounted in coil 105 is a metallic plunger 112. When the speed regulating device is in operation plunger 112 blocks aperture 113 in conduit 103 preventing air flow into conduit 103 through apertures 114 and 113. The speed regulating unit may be disengaged, however, by application of the motor vehicle brakes which causes current to flow through coil 105. Current flow in coil 105 creates a magnetic field which moves plunger 112 to the right, as illustrated in FIG. 2, thus completely venting side 104 of housing 66 to the atmosphere.

To understand the operation of this embodiment of the invention assume that the vehicle is running steadily at the speed set on the control unit 64. Under this condition valve 97 is open just enough to cause the proper vacuum in side 104 of housing 66 to balance the cable 68 against the throttle at the proper throttle opening to maintain the set speed. This means the pressure difference across diaphragm 87 is just enough to balance valve 97 against its spring at the necessary opening.

If the automobile then encounters an incline so that it slows slightly from the set speed, the rotation of shaft 73 slows and plug 82 moves inwardly due to decreased centrifugal force exerted by weight 81. The flow resistance of the speed sensor 63 is increased which in turn increases the vacuum in side 91 of enclosure 86. The greater pressure difference across diaphragm 87 causes a greater force to the left on valve 97 thus opening the valve more. This increases the vacuum in side 104 of housing 66 causing the vehicle to accelerate until it regains the set speed.

Similarly, a slight increase in speed of the vehicle causes a decrease in flow resistance of speed sensor 63, a decrease in vacuum in side 91 of enclosure 86, a rightward movement of valve 97, decrease of vacuum in side 104 of housing 66 and deceleration of the vehicle. Thus, the FIG. 2 embodiment like the FIG. 1 embodiment automatically maintains a uniform speed.

Changes in set speed are made by turning knob 96, thus changing its flow resistance. If the knob is turned to increase the flow resistance of valve 95, the vacuum in side 89 of enclosure 86 increases, valve 97 moves to the right and the motor vehicle slows until the resistance of the speed sensor 63 increases so a new, slower stable speed is reached. Conversely, a decrease of resistance of valve 95 causes an increase in set speed.

The regulating device may be in disengaged by depressing the vehicle brake pedal as explained before. When plunger 112 is manually pushed back into aperture 113 the regulating device is re-engaged and the vehicle resumes the set speed.

The FIG. 2 embodiment also employs a flexible cable 68, as explained before, so that the regulating device can be overridden by pushing the conventional accelerator pedal.

While the embodiments illustrated have used a negative pneumatic pressure, i.e., a vacuum, the embodiments may be slightly revised to employ a positive pneumatic or hydraulic pressure, i.e., compressed air or other gas or liquid under pressure to accomplish the same results. If higher actuator forces are desired than are produced by the illustrated embodiments, a hydraulic pump could be used to supply the forces which are pneumatically created in the described embodiments. In the event a hydraulic pump is used, the various vents could be provided with return lines to a liquid reservoir. As is obvious, an embodiment of the present invention which utilizes hydraulic forces would also give the device a quicker response than will be realized with pneumatic pressures.

As will be noted, a valuable and novel feature of the invention is that it will operate using a variable source of pressure, such as the manifold vacuum of an automobile. Errors in set speed are detected by determining the *ratio* of flow through the speed sensor and speed setting units, and the ratio will be essentially independent of the pressure of the fluid source.

While several embodiments have been illustrated and described and rather specific terms have been used to describe these embodiments, the terms are not intended nor should they be construed to be a limitation upon the scope of the invention as defined by the claims.

What is claimed is:

1. An adjustable regulating device for controlling the speed of a motor vehicle having conventional braking means and powered by an internal combustion engine which has a throttle mechanism and a speedometer cable, the device comprising:

a first diaphragm;
an enclosure which sealingly engages the first diaphragm about its periphery;
means for restrictingly communicating each side of the enclosure with a vacuum source;
means carried by the enclosure for adjustably venting one side of the enclosure to the atmosphere;
a shaft adapted to mateably engage the motor vehicle speedometer cable and be rotated thereby;
the shaft being provided with an air passageway therethrough one end of which opens through an aperture to the atmosphere and the other end of which communicates with the other side of the enclosure;
valve means registering with the air passageway aperture;
the valve means being spring biased into engagement with the aperture and adapted to be moved away from engagement with the aperture by rotatable movement of the shaft, the degree of engagement of the valve means with the aperture depending upon the speed of rotation of the shaft;
a second diaphragm;
a housing which sealingly engages the second diaphragm about its periphery;
conduit means communicating one side of the housing with one side of the enclosure;
said conduit means being provided with an aperture which opens to the atmosphere;
valve means responsive to movement of the first diaphragm and interposed in the conduit means for regulating flow therethrough; and
means connecting the second diaphragm to the motor vehicle throttle mechanism whereby movement of the diaphragm will effect movement of the throttle mechanism;
means for complete venting of said one side of the housing to the atmosphere upon application of the motor vehicle brakes;
said last-mentioned means including a conduit communicating between said one side of the housing and the atmosphere;
a magnetically responsive plunger adapted to be moved into and out of engagement with said conduit;

a coil surrounding the plunger for withdrawing the plunger from blocking engagement with the passageway when a voltage is impressed across the coil;

the ends of the coil being operably connected across the motor vehicle brake like conductors.

2. A regulating device for controlling the speed of an internal combustion engine driven motor vehicle provided with conventional throttle, speedometer cable and brakes, the device comprising:

a first diaphragm connected to the motor vehicle throttle whereby movement of the first diaphragm will effect movement of the throttle mechanism;

a housing which sealingly engages the first diaphragm about its periphery so that the housing is thereby divided;

means communicating one side of the housing with a vacuum source;

a partition disposed across said one side of the housing, the partition being provided with an aperture which permits communication between the vacuum source and the atmosphere through an aperture provided in said one side of the housing;

valve means associated with the aperture in the partition for controlling flow therethrough;

a second diaphragm operably associated with the valve means so that the valve means will be responsive to movement of the second diaphragm;

an enclosure which sealingly engages the second diaphragm about its periphery so that the enclosure is thereby divided;

means including fluid flow restrictions for communicating each side of the enclosure with a common vacuum source;

a conduit communicating one side of the enclosure with the atmosphere;

manually operable valve means for interposition in the conduit for variably venting said one side of the enclosure to the atmosphere; and motor vehicle speed sensing means for controlling the venting of the other side of the enclosure to the atmosphere, which means include:

means including a conduit communicating said other side of the enclosure with the atmosphere, valve means adapted for interposition in the means communicating said one side of the enclosure with the atmosphere for regulating flow therethrough, and a centrifugal force actuatable governor adapted to be operably associated with the last mentioned valve means and with the motor vehicle speedometer cable whereby the valve means will be responsive to the speed of the speedometer cable.

3. The apparatus of claim 2 including:

means operably associated with the vacuum communicating means and responsive to application of the motor vehicle brakes for interrupting vacuum to the housing upon application of the motor vehicle brakes.

4. The apparatus of claim 3 wherein the means for interrupting vacuum communication comprise:

a generally dish shaped receptacle which is provided with a lip;

a first conduit means opening into the bottom of the receptacle and communicating the receptacle with a vacuum source;

second conduit means opening into the bottom of the receptacle and communicating the receptacle with the said one side of the housing;

the first conduit being provided with a poppet valve which extends above the lip of the receptacle and is spring urged toward sealing engagement with its seat in the first conduit;

a pivotally mounted receptacle cover adapted to be moved into engagement with the lip of the receptacle thereby depressing the poppet valve and permitting communication between the first and second conduits through the receptacle; and the cover having an arm adapted to be positioned beneath the brake pedal of the motor vehicle in such a manner that depression of the brake pedal will remove the cover from the receptacle and the cover also being weighted for maintaining it in a normally disengaged position after application of the motor vehicle brakes.

References Cited

UNITED STATES PATENTS

| | | | |
|---|---|---|---|
| 3,023,828 | 3/1962 | Fuller et al. | 180—82.1 |
| 3,028,847 | 5/1962 | Sterner | 123—103 |
| 3,072,111 | 1/1963 | Cramer | 180—82.1 X |
| 3,109,507 | 11/1963 | McMurray et al. | 180—82.1 |
| 3,133,610 | 5/1964 | Sheppard | 180—82.1 |
| 3,268,026 | 8/1966 | MacDuff et al. | 180—82.1 |

KENNETH H. BETTS, *Primary Examiner.*